UNITED STATES PATENT OFFICE.

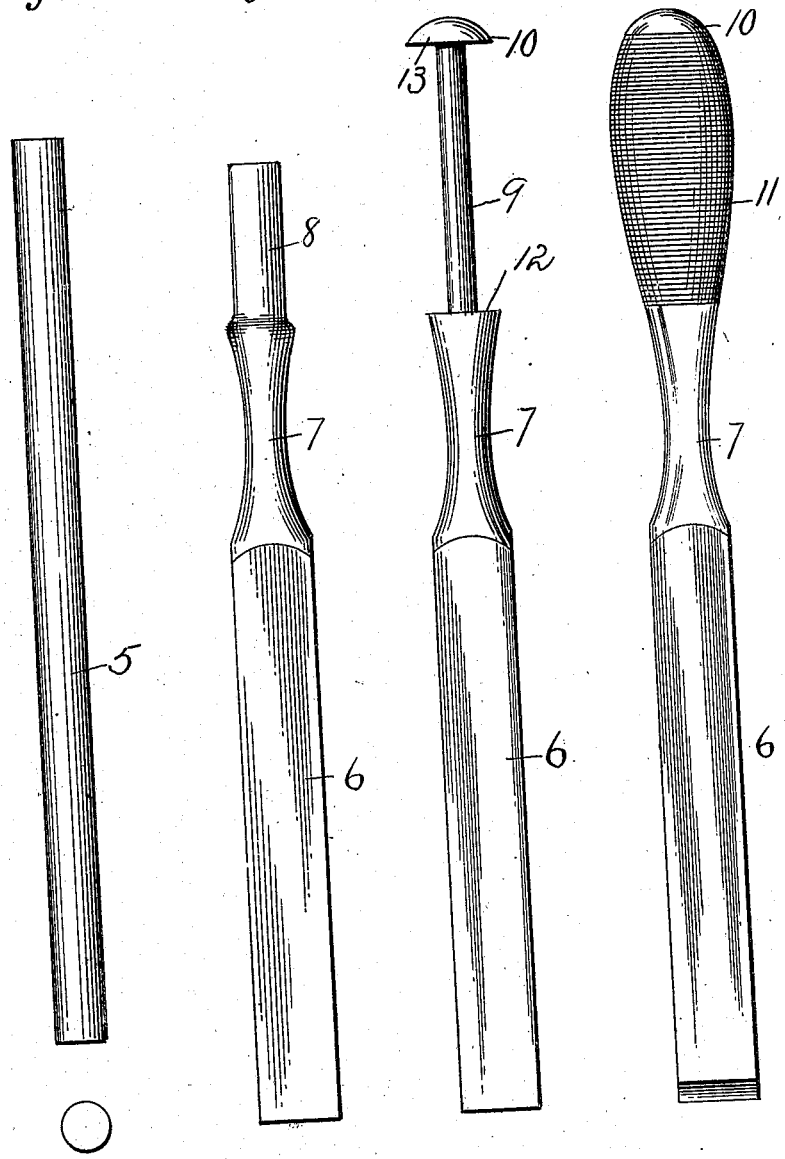

GEORGE E. WOOD, OF SOUTHINGTON, CONNECTICUT.

METHOD OF MAKING HAND-TOOLS.

No. 924,210.

Specification of Letters Patent.  Patented June 8, 1909.

Application filed February 21, 1908. Serial No. 417,189.

*To all whom it may concern:*

Be it known that I, GEORGE E. WOOD, a citizen of the United States, and a resident of Southington, in the county of Hartford and State of Connecticut, have invented a new and Improved Method of Making Hand-Tools, of which the following is a specification.

My invention relates to the class of small hand tools such as screw drivers, chisels and the like, and the object of my invention is to provide a tool of this class having numerous features of advantage and utility.

A form of tool and the construction of the same in the use of which the object sought may be attained is illustrated in the accompanying drawings, in which—

Figure 1 is a side view of a blank from which a tool is to be produced. Fig. 2 is a view of the blank illustrating one step in the method of production. Fig. 3 is a view showing a still further step in the production of the tool. Fig. 4 is a side view of the finished tool.

My invention being especially applicable to a hand tool in the use of which blows are struck upon the handle as by a mallet, handle or like tool, a chisel as such a tool has been chosen by me for the purpose of illustrating my invention. It will be understood, however, that the invention is not limited to such a tool but may be readily embodied in tools adapted for other uses.

In the accompanying drawings the numeral 5 denotes a bar of stock, preferably round in cross-section and of any suitable metal. This bar is cut to suitable length and then by manipulation is brought to the form shown in Fig. 2, which includes a blade 6, a shank 7 and a tang 8. By subsequent manipulation the tool is brought to the form shown in Fig. 3, in which the blade and shank have not been disturbed. The tang 8, however, has been drawn into a stem 9 having a head 10 integrally formed thereon. The tool is now in approximate condition, except possibly for finishing in slight particulars, to receive a handle. This handle 11 may consist of any suitable material and be applied in any desired manner. For instance, it may consist of strips of leather or other fibrous material wound about the stem and suitably secured thereto and afterward shaped to desired form and finished to any desired degree, or the handle may consist of material applied to the stem 9 from opposite sides.

In forming the stem 9 a shoulder 12 is provided at the base of the stem and also underneath the head 10. These shoulders form seats for the handle that is secured tightly against said shoulders. From this construction it will be seen that a tool is obtained having a handle or grip which, however, will not be materially affected by blows struck upon the end of the handle, for the reason that the head 10 receives the blows which are transmitted directly through the stem 9, shank 7 to the blade 6, so that the grip or handle 11 is required to sustain little, if any, of the shock incident to blows struck upon the end of the handle.

I claim:—

A method of forming a tool that consists in drawing a shank from a piece of stock and forming a shoulder thereon, drawing a stem beyond said shank and forming a head at the end of the stem, thus providing a groove between said shoulder and head, and then completely filling the groove by placing an entire handle within said groove and tightly and immovably securing it in place.

GEORGE E. WOOD.

Witnesses:
 GEORGE B. MESEROLE,
 AUGUSTINE M. LEWIS.